United States Patent [19]
Constant

[11] 3,858,203
[45] Dec. 31, 1974

[54] SYNTHETIC RADIOMETER AND SYSTEM FOR IDENTIFYING OBJECTS

[76] Inventor: James Nickolas Constant, 1603 Danbury Dr., Claremont, Calif. 90711

[22] Filed: Sept. 11, 1972

[21] Appl. No.: 288,049

Related U.S. Application Data
[63] Continuation-in-part of Ser. No. 52,665, July 6, 1970, abandoned.

[52] U.S. Cl.......... 343/6.5 SS, 356/28, 340/146.3 F
[51] Int. Cl............................. G01s 9/56, G01p 3/36
[58] Field of Search....... 343/6.5 SS, 5 CM; 356/28, 356/29, 112, 113, 106 R; 340/146.3 F

[56] References Cited
UNITED STATES PATENTS

| | | | |
|---|---|---|---|
| 3,286,582 | 11/1966 | Mertz | 356/106 R |
| 3,519,351 | 7/1970 | Lerwill | 356/28 |
| 3,547,540 | 12/1970 | Shigemoto | 356/28 |
| 3,569,996 | 3/1971 | Goell et al. | 356/106 R |
| 3,675,029 | 7/1972 | Iten et al. | 356/28 |

Primary Examiner—T. H. Tubbesing
Assistant Examiner—S. C. Buczinski
Attorney, Agent, or Firm—Harris, Kern, Wallen & Tinsley

[57] ABSTRACT

A synthetic radiometer having an antenna unit for receiving radiation from an object of interest, a detector for a radiation beam from the antenna unit, a receiver for signals from the detector, and a data processor for the receiver output, with a delay unit and a frequency synchronizer between the antenna unit and the detector, with the delay unit producing cosine modulation of the beam from the antenna unit and with the frequency synchronizer changing the frequencies in a signal spectrum of the beam to mean frequency.

20 Claims, 9 Drawing Figures

SYNTHETIC RADIOMETER AND SYSTEM FOR IDENTIFYING OBJECTS

This application is a continuation-in-part of my copending application entitled "Synthetic Radiometer and Encoding Array," Ser. No. 52,665, filed July 6, 1970, now abandoned.

The present system relates to automatic systems for mapping ground targets, reading documents, identifying objects, and the like, and in new and improved mapping, general reading, label reading, and labeling systems. More particularly, this invention relates to improvements in radiometer type sensors and more specifically to the improvement in the signal power level and resolution which can be obtained by a sensor. By means of such improvements, the range of detection and the capability to distinguish between closely separated objects are considerably enhanced. This is accomplished by integrating, summing, or multiplying the instantaneous signals which appear at the lens or aperture of the sensor in a manner which is quite analogous to that which is employed in synthetic radar. The signals may be integrated coherently in a predetection sense if they are themselves coherent or, alternatively, are integrated incoherently in a postdetection sense. In either case, higher peak signal power levels and higher resolving capabilities are obtained over conventional systems.

The resolution in a conventional sensor, generally, is limited by the effect of diffraction of its lens or aperture. The outstanding exception of this rule is the resolution of coherent sources which move and which permit the sensor to generate a synthetic aperture which is much greater than the actual aperture of the system. The resolution which is obtained with a synthetic aperture far exceeds the limit prescribed by diffraction alone. No known conventional sensor however accomplishes this feat when the source is a non-coherent source. The present invention generates a synthetic aperture when the source is moving irregardless whether it emits or reflects energy which may be coherent or non-coherent.

There is a need for small and cheap yet accurate and fast sensing of extremely high resolution which do not require: (1) precise alignment of the object with respect to the sensor, (2) precise angular orientation of the object with respect to the sensor, (3) excessive utilization of the electromagnetic spectrum at the frequency of its operation, (4) precise constraint to a particular narrow portion of the acoustic or electromagnetic spectrum, (5) constraint to the immediate or near vicinity of objects being sensed, (6) large lenses, antennas, or apertures, (7) bistatic separation between transmitters and receivers, (8) special, precise, or complex objects as labels or targets, (9) complex, large, heavy, and power consuming sensors, (10) preemphasis of targets against background proximity effects, (11) cooperative objects or targets or specially constructed label elements, (12) active operation of sensors, (13) special emissions or reflections by the target or label elements, and (14) excessive utilization of power by the system.

A typical application of such a system is the identification and control of manufactured products, assembly line products, inventories, and the identification and routing of mail, stocks, and the like. Another application of such a system is the identification of vehicular traffic (automobiles, railroad cars, etc.). Other applications are the reading of pages in a book, pattern or letter recognition, and the mapping of the ground from aircraft and orbital altitudes.

In many instances it is desirable to identify or resolve targets using simple and cheap equipment. Typical examples are in the fields of automatic vehicle identification, transportation, product manufacturing, inventory control, postal sorting, ground mapping by satellite or aircraft, air surveillance, etc. In these fields it often happens that the objects cannot be identified or resolved efficiently using conventional means. Therefore, a suitable device, such as a synthetic radiometer must be provided to efficiently accomplish the identification or resolution of objects. The new and improved synthetic radiometer of the present invention permits the object to be identified or resolved efficiently by generating a synthetic aperture which is much larger than the actual aperture of the system.

Examples of sensors and encoding arrays presently in use for the identification or resolution of objects are based on magnetic, electromagnetic (low frequency induction, radio frequency transmission, microwaves, infrared, and optics), and radiation principles for their operation. Nearly all sensors operate on the principle that energy must be generated and transmitted to the specially constructed encoding array being identified or resolved which then reflects and returns the transmission to the sensor receiver where it is subsequently analyzed. Such devices are active energy transmission and reception systems and depend on the target ability to reflect the incident energy. Exceptions occur in some devices which employ the magnetic induction sensing of permanent magnets or the sensing of radiating elements. Passive receivers are employed in these latter applications which depend exclusively on the target omissions. Passive devices singularly lack the ability to generate a synthetic aperture. In each of these types of devices, whether active or passive, the main criteria which determine their effectiveness are efficiency, contrast, range, and resolution. Efficiency denotes such considerations as physical size and weight, volume, power consumption, and the active or passive operation of either or both the sensor and encoding array. Contrast is a term which denotes the ability of the sensor to detect, identify, and resolve objects being viewed in the general presence of influences or reflections from other objects in the sensor's field of view. Range denotes the ability of the sensor to detect, identify, and resolve objects at a distance from the sensor. The term resolution is most frequently used to denote the smallest extension between two objects which the sensor is able to separate or differentiate.

Active sensors, in many cases, are capable of generating a synthetic aperture but are inefficient by virtue of the fact that they must maintain transmissions. Passive sensors on the other hand are efficient devices, in many cases, but often have little to offer by way of resolution. In magnetic induction and radiation type sensors, the identification and resolution of objects is critically limited to short range while electromagnetic sensors are similarly confined to short range for two main reasons: first the fourth power dependence of the received energy and, in many cases, the presence of a low contrast background. In each case above, the attainment of satisfactory efficiency, contrast, range, and resolution may be obtained marginally and at the expense of added cost and sophistication.

Conventional radiometers are limited, in many applications, in their ranging, contrasting, and resolving powers for three main reasons; first, RF phase is not available from non-coherently radiating sources, second, information phase is generally negligible at optical frequencies and, third, optical/IR receivers have not been optimized for preserving information phase. As a consequence, the lack of ranging, contrast, and resolution inherently limit the operational use of these devices to but coarse measurements. As example, convenient size radiometers provide resolution on the order of 1,000 feet from orbital altitudes. Several conventional radiometers are described in "Spacecraft Infrared Imaging," John J. Horan, IEEE Spectrum July, 1968, page 66 and "Aerospace Sensor Systems," G. Manella Astronautics & Aeronautics, Dec. 1968, pages 33, 34.

Sources which are stationary with respect to a receiver, whether coherent or not, cannot be resolved any better than to the limit which is prescribed by the diffraction in the viewing lens or aperture. An exception of course is the case when the sources are themselves modulated and act as signaling sources. If intelligible communications can be established between the stationary source and receiver then position information can be made available by the former to the latter and in this manner to overcome the limit imposed by diffraction. Stationary targets however are but a small group of the general class of moving targets.

Moving coherent sources can be processed in a receiver in the well known manner of synthetic radar and thereby achieve significant improvement in the ranging, contrasting, and resolution of targets above those limits prescribed by diffraction. Unfortunately, nature is uncooperative in this particular respect and most sources of interest radiate non-coherently. Even so, non-coherent moving sources can be detected or heard as, for example, the well known case of an approaching vehicle or train in which case the information phase is carried on a non-coherent band of frequencies. At optical frequencies however, the information phase in most applications is negligible so that what little information or doppler is carried to the receiver is of no consequence and is either neglected or even destroyed. Conventional receivers in the main have not been optimized to preserve or extract the information phase of non-coherent moving sources. An outstanding example of a not so well known receiver in which it becomes possible to preserve signal information phase from non-coherent moving sources is based on the Alford and Gold effect (See Ref. 1) in which a cosine modulation of the signal amplitude is feasible.

The present invention overcomes the problem of preserving the information phase relationships from either coherent or non-coherent moving sources by employing a new technique in some ways analogous to that employed in synthetic radar and in conjunction with a receiver based on the Alford and Gold effect, and results in a synthetic radiometer of vastly improved performance and efficiency. In the synthetic radiometer, signal samples collected at successive positions along an aperture length can be delayed and integrated after detection to synthetically produce an effective aperture much larger than the real aperture of the collector.

A practical sensor or reading system should be operable without being constrained by the emissive or reflective characteristics of the target or object being detected or measured and without requiring active coherent transmissions of energy to permit the generation of a synthetic aperture. More particularly, a practical sensor or reading system should be operable without requiring precise object alignment, precise object orientation, excessive spectrum utilization, precise spectrum location, range constraint, lens, aperture, or antenna size constraint, bistatic reception, special objects or elements as targets, system complexity, active operation, coherently or non-coherently emissive or reflective targets, use of resonating labels, and excessive power consumption. The sensor and labels when used must be quite cheap because many of them will be utilized in some applications while in other applications the sensors must be quite simple and effective to be carried within the limited confines of vehicles (satellites, aircraft, etc.). In particular, both sensors and labels should be operable without requiring periodic inspection, cleaning, without requiring physical contact or manual intervention because they will be inaccessible or automatic during operation. The possibility of error must be quite low in identification applications while the ability to resolve objects or elements must be quite high. There must preferably be no moving parts to degrade the system reliability and lifetime.

The presently suggested systems have not met many of these requirements. Both optical and microwave mapping, reading, and identification systems are extremely susceptible to one or more of the following: Object alignment, object orientation, excessive spectrum utilization, range constraint, lens, aperture, or antenna size constraint, bistatic operation, system complexity, size, weight, and power requirements, background proximity effects, the necessity of implementing special objects or label elements as targets, the use of resonating labels, and excessive power consumption. Most systems require active transmitters as well as resonating elements for their labels. Furthermore, to obtain significant improvements in their efficiency, contrast, range, and resolution, these systems must operate coherently. Such systems have therefore expensive and inefficient sensing or reading apparatus and are restricted to reading specially structured and therefore expensive and inefficient labels. Many such systems also have moving parts.

There are distinct economic and technical limitations with respect to any system adopted to automatic mapping, reading, or identification of objects. One example of an economic limitation is presented in connection with a system adopted to automatic identification of objects using labels and has to do with the large number of objects which are to be uniquely identified by the system. Clearly, the cost of both readers and labels must be constrained within limits which permit the economic use of the system. Thus, the cost of labels for identifying mail pieces must be kept to within a fraction of one cent while the cost of readers must be kept to less than $5,000 and preferably less than $1,000. An example of a technical limitation is presented in connection with a system adopted for the high resolution mapping of the ground from the limited confines of a satellite, and has to do with the system efficiency, weight, size, volume, and power consumption. In the former example, the use of either active labels such as transducers, etc. or the use of complex passive labels such as resonators, etc. and the use of active transmitters are out of the question because of excessive cost.

Both labels and readers must be simple and cheap in this type application of a system. In the latter example, the use of active transmitters results in systems of large size, weight, and power requirements and are out of question because of excessive cumbersomeness. The sensor must be the least cumbersome in size, weight, and power requirements in this type application.

The present invention utilizes the spatial or doppler coherence of signals in a simple and cheap sensor to produce an extremely high resolving capability thus permitting its direct application to ground mapping from orbital altitudes, letter recognition, and the identification of objects using simple and cheap labels.

The present invention is directed to a passive or active sensor which generates a synthetic aperture and is highly efficient and which overcomes many of the problems and limitations encountered with conventional sensors. The invention is particularly well suited to applications where extremely high resolution is required. In accordance with the present invention, objects can be resolved on the ground from high altitude or, in labeling applications, objects can be identified using simple and cheap labels and sensors. The present invention has high efficiency, contrasting, range, and resolution when compared to the present state-of-art systems.

Utilizing the system of the present invention objects may be identified using simple labels in labeling applications and objects may be mapped on the ground from satellites or aircraft in surveillance applications, efficiently and with extremely high resolution.

It is a general object of the invention to provide such a new, improved, simple, and cheap sensor system which overcomes the disadvantages of the prior art systems. A particular object is to provide a simple and cheap reader device which is capable of operating passively using non-coherently radiating targets as objects. An additional object is to provide a simple and cheap label which is capable of operating without the use of special structures such as resonators, etc.

It is therefore an objective of this invention to provide an efficient sensor which is capable of generating a synthetic aperture using either coherent or non-coherent sources. Another objective of this invention is to provide an efficient system with extremely high contrasting and resolving powers at long range. Another objective of this invention is to provide a system with high efficiency, contrasting, range, and resolving powers which is capable of passive operation in a low contrast background. Another objective of this invention is to provide an efficient system of high contrast which is capable of identifying and resolving objects at long range. A further objective of this invention is to provide an efficient encoding array which can be attached to the object being identified.

Other objects, objectives, advantages, features, and results will more fully appear in the course of the following description. The drawing merely shows and the description merely describes a preferred embodiment of the present invention which is given by way of illustration.

The present invention provides a delay unit in a synthetic radiometer between the antenna unit and the detector. The delay unit directs the beam along at least two paths of different length and combines the two into a resultant beam which is modulated and which can be detected and processed to provide information on individual objects in the field of the antenna unit. This is in contrast to the conventional radiometer wherein the detector input contains no doppler information and the detector output is a d.c. summation of the input containing no position or multi object resolution information.

The present invention will be discussed using conventional synthetic aperture as a reference to establish the basis for its operation. Thus, a coherent source will first be considered in transit of a diffraction limited lens or aperture in the manner of conventional synthetic aperture. In the course of the disclosure it will then become apparent that the present invention can similarly produce a synthetic aperture equally well whether or not the source radiates coherently or non-coherently.

Figures 1, 2, 3, 4, 5, 6A, 6B, 6C, 7:
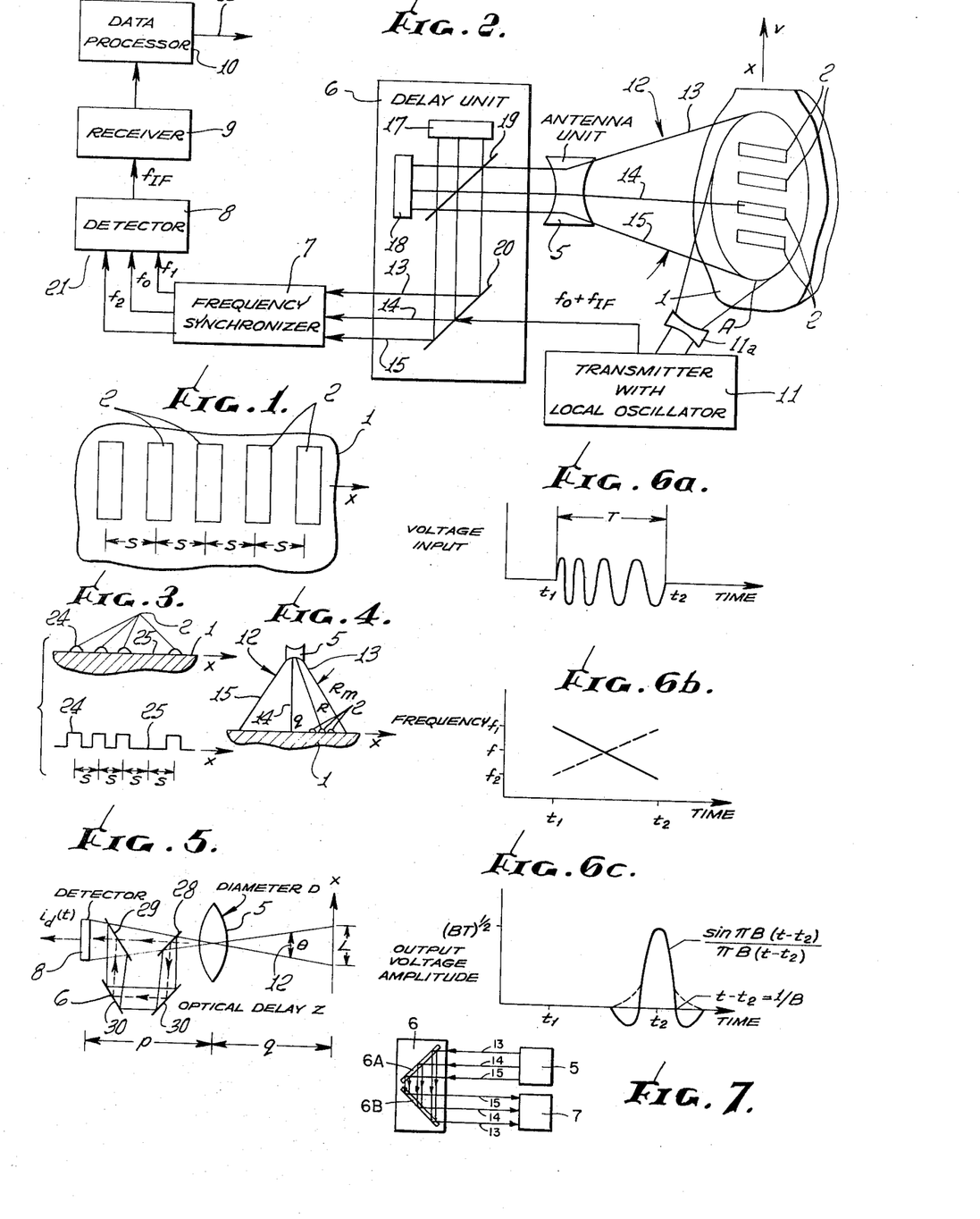
FIG. 1 is a top view of an encoding array.
FIG. 2 is a block diagram of a synthetic radiometer and encoding array illustrating a preferred embodiment of the invention.
FIG. 3 is a time plot which illustrates the relationships existing between the elements of the encoding array and pulses which appear at the output of the synthetic radiometer.
FIG. 4 is a description of the basic system geometry.
FIG. 5 is a simplified illustration of the synthetic radiometer of FIG. 2 and will be used in the analysis of the system of the present invention.
FIGS. 6a, 6b and 6c illustrate an example type of a waveform which is generated by the synthetic radiometer and is due to a single encoding element transiting the field of view.
FIG. 7 is a diagram illustrating alternative embodiments of the delay unit of FIG. 2.

In order to describe the encoding array reference is made to FIG. 1. Attached to the object being examined 1 is an array of naturally coherent or non-coherent emissive elements 2 attached to the object 1. Each element 2 has an area $A_s$ which is determined by the application at hand. The elements 2 are characterized as having a difference in their spectral emissivities as compared to the object 1. The number of element locations $N$ in the encoding array is $N = n + m$, where $n$ is the actual number of elements 2 filling any number of the $N$ equidistant locations and $m$ is the number of unfilled locations in the array. The number of elements 2 which actually occupy locations are determined according to the particular coding assignment which is given to each encoding array. Thus, although $N$ element locations are available, in general, some element locations will be vacant of elements in a given typical encoding array. In some applications, it may be necessary to code elements 2 using different frequencies or colors. The spacing $s$ between element locations is determined, in many applications, by the resolving capability of the synthetic radiometer. The encoding array moves in the direction $x$.

Referring to FIG. 2, the synthetic radiometer and encoding array system consists of the object being observed 1, encoding array elements 2 attached to object 1, an antenna unit 5, a delay unit 6, a frequency synchronizer 7, a detector 8, a receiver 9, a data processor 10, and for some applications, a local or transmitting oscillator 11 with antenna unit 11a. The items 5 through 11 collectively constitute a synthetic radiometer. The synthetic radiometer may be any one of any number of types subject to the constraints imposed in its use as a synthetic aperture in accordance with the technique of the present invention.

Elements 5, 8, 9 and 10 are found in conventional radiometers and may be any of the known units. The antenna unit may be a lens or other optical device used at optical frequencies or may be an antenna structure used at millimeter and infrared frequencies. The antenna unit has a beamwidth 12, and may be scanned by conventional techniques if desired. The delay unit 6 and frequency synchronizer 7 are known elements per se, but are new in radiometers.

The object 1 and encoding array 2 produce a signal when viewed by the diffraction limited beamwidth 12. The portion of object 1 seen by the beamwidth 12 is the area $A = n A_s + A_c$ where $A_s$ is the area of a single element 2 and $A_c$ is the remaining area in $A$. The exact frequency of operation is determined by the application at hand. Any of the well known types of antenna units, such as converging lenses, defocusing mirrors, or diverging lenses, may be utilized. The signal from the antenna unit 5 is directed to the delay unit 6, shown as a broadband Michelson type beamsplitter. Any of the well known types of delay units may be utilized, including the Michelson interferometer, the Fabry-Perot interferometer, Nicol, Rochon and Wollaston prisms, and reflectors with multilayer interference coatings.

Shown in FIG. 2 are two mirrors 17 and 18, a beamsplitter 19, and a partially reflecting mirror 20. The signals which appear from top to bottom at the input to the frequency synchronizer 7, at any single instant, represent signals captured by the beamwidth 12. Three such signals are shown 13, 14, and 15, and are shown traced through the delay unit 6. These signals are characterized as each having the same coherent frequency when the target itself is a coherent source or each having the same spectral distribution when the target itself is a non-coherent source. The particular signal 14 remains unchanged in its coherent frequency or spectral distribution as the object 1 moves in the direction $x$. All other signals are shifted in their coherent frequency or spectra according to the doppler law. Shown in FIG. 2 are the frequencies $f_1, f_0, f_2$ which correspond to the three paths 13, 14, and 15, respectively. FIG. 7 illustrates the delay unit 6 incorporating elements 6A and 6B which may be a Fabry-Perot interferometer, or Nicol, Rochon and Wollaston prisms, or a pair of reflectors with multilayer interference coatings, all operating in the same manner providing the equivalent of the Michelson interferometer of FIG. 2.

All signals appearing at the frequency synchronizer 7 have been modulated in amplitude by the delay unit 6 in a manner which preserves the doppler information. The frequency synchronizer 7 is designed with a characteristic which changes most or all frequencies, in a given signal spectrum, to its mean frequency and may be used optionally only when the signals are non-coherent. The frequency synchronizer 7 is not essential to the basic operation of the system of the present invention but serves the purpose of increasing the total amount of signal energy available for processing. Any of the well known frequency synchronizers, multilayer thin film coatings, frequency shifters, heterodynes, solid state modulators, etc., which can provide the desired increase of low spectral frequency components and corresponding decrease of high spectral frequency components in a signal spectrum until most or all energy appears at the mean frequency of the signal, may be utilized.

The signals, whether these be coherent or not, which appear at the input 21 to the detector 8 all have carrier $f_o$ excepting that they are shifted in doppler by amounts $f_d$ according to their displacement away from the particular path 14. Photomixing or photodetection of signals occurs at the detector. Any of the well known detectors, such as imaging devices, single point detectors, one-dimensional arrays or multidimensional arrays of detectors, may be utilized.

The signal, in conventional synthetic aperture, is fed to the receiver 9 as an RF carrier with frequency modulation FM. In the system of the present invention, the signal, whether coherent or non-coherent, is similarly fed to the receiver 9 primarily as a DC pulse which is cosine modulated in amplitude. Any of the well known types of receivers, such as direct or heterodyne types, may be utilized. Finally, the receiver output is fed to the data processor 10. Any of the well known types of data processors, such as photographic film and optical readout for stored data operations, or pulse compression circuits for real time operations, may be utilized.

In many applications, a local or transmitting oscillator 11 may be added to the system to provide stable reference, intermediate frequency (IF) operation as a local oscillator in a heterodyne receiver, to provide active transmissions through addition of a transmitter, or as one means of obtaining range and range resolution through addition of a transmitter. Any of the well known types of local or transmitting oscillators, may be utilized.

In the synthetic radiometer and encoding array system just described, the object 1 being observed moves in the direction $x$ relative to the radiometer and with velocity $v$. The relative velocity $v$ is obtained through object 1 motion, radiometer motion, or combinations of both motions. Pulses appear at the output 23 of the data processor 10 which correspond one-for-one with locations in the encoding array occupied by the encoding elements 2. Each such pulse is the result of integration of the signal produced by a single encoding element 2 during its transit of the beamwidth 12.

FIG. 3 illustrates the correspondence between encoding elements 2 and the output pulses at 23. A single pulse 24 appears at the output 23 of the data processor 10 for each encoding element 2. No pulses appear when encoding elements are missing in a given location 25 in the encoding array of elements 2. The pulses are separated by distance $s$ which is determined by the resolving power of the synthetic radiometer. The height of the pulses at the output 23 is determined by the contrast of encoding elements 2 when seen in the background of the object 1, and the bandwidth-duration product of the signal. The width of pulses at the output 23 is determined by the resolving power of the synthetic radiometer.

FIG. 4 illustrates the basic geometry of the system. The encoding elements 2 move in the direction $x$ relative to the antenna unit 5. The shortest slant range of approach between the element 2 and antenna unit 5 is $q$, and $R_m$ is the maximum slant range viewed by the beamwidth 12. It is a well known fact of conventional synthetic aperture radar that the doppler shift $f_d$ of the signal seen by the aperture or lens at the antenna unit 5 is proportional to the distance between the element 2 and the line of symmetry 14. This face is the basis upon which it becomes possible to generate a synthetic aperture. Thus, in conventional synthetic aperture, the signals arriving at the aperture of the antenna unit 5 from a single element 2 are delayed and processed over a time period $T$ which corresponds to the time of element 2 transit in the beamwidth 12. In the system of the present invention, the signals arriving at the aperture of the antenna unit 5 are subsequently amplitude modulated by the delay unit 6 and then detected and processed. In conventional synthetic aperture, the signals are processed in the predetection sense while in the system of the present invention, the signals are processed in the postdetection sense. In either case, a synthetic aperture is generated, in the former case using coherent signals and coherent integration of signals while in the latter case the signals may or may not be coherent and the integration of the signals may be coherent or non-coherent.

FIG. 5 illustrates a simplified form of the system of FIG. 2, and includes a lens as the antenna unit 5, a beamsplitter as the delay unit 6, and a detector 8. In the delay unit, an incoming beam from the lens is divided into two paths at the beamsplitter 28, one path going directly to a recombiner 29 and the other going to mirrors 30 and to the recombiner 29, with the two paths recombined at 29. The object distance is $q$ and the image distance is $p$. If the lens diameter is $D$, then the smallest angle between two objects or point sources at the object distance $q$ is approximately:

$$\theta = \lambda/D \tag{1}$$

where
 $D$ = diameter of lens or aperture of the antenna unit 5
 $\lambda$ = wavelength The angle $\theta$ at 12 subtends the distance $L$ at the object distance $q$. Equation (1) defines the theoretical limit of resolution in a lens limited by diffraction, when the point sources are stationary with respect to the lens. The significance of the angle $\theta$ in a lens or aperture is that a point source which is located on the lens axis at the object distance $q$ will produce a spatially extended image at the image distance $p$. The detector 8 is located at the image distance $p$ and must completely fill the angle $\theta$ for maximum energy capture. The beamsplitter 6 provides an optical delay $Z$ for each frequency in the source spectrum.

The Alford and Gold effect (See Ref. 1) is the cosine modulation of a broad spectrum light signal. The cosine modulation is produced when the beam is divided in half and a path difference of $\tau$ seconds is obtained between the beams before they are combined in a quantum detector 8. The cosine modulation is a function of the time delay $\tau$ and is expressed by $\cos(\omega\tau/2)$ where $\omega$ is a spectral frequency in the source frequency spectrum. There have been several derivations of this effect (See Refs 1, 2, and 3). A description of the Alford and Gold effect which includes the effect of a source moving in the direction $x$ parallels that given by Givens (See Ref 2) and gives the following expression for the frequency spectrum of the two recombined beams:

$$S_d(\omega+\omega_d) = \cos[(\omega+\omega_d)\tau/2]S(\omega+\omega_d) \tag{2}$$

where
 $S_d(\omega+\omega_d)$ = recombined beam frequency spectrum
 $S(\omega+\omega_d)$ = source frequency spectrum
 $\omega = 2\pi f$ ($f$ = frequency)
 $\omega_d = 2\pi f_d$ ($f_d$ = doppler frequency)
 $\tau$ = time delay; equals the ratio $d/c$ where $d$ is the path difference between the two beams and $c$ is the velocity of light.

Equation (2) relates the fact that source motion shifts the source and recombined beam spectra while the cosine modulation produced by the beamsplitter 6 amplitude modulates the source frequency spectrum. The recombined beam frequency spectrum along path 14 has maxima at frequencies $$\omega_n = n(2\pi/\tau) \quad n = 0, 1, 2, \ldots \tag{3}$$

Equation (3) defines frequencies $\omega_n$ at which maxima occur.

The doppler frequency $\omega_d = 2\pi f_d$ is given by:

$$f_d = v\,x/\lambda q = (v\,x/c\,q)f \tag{4}$$

where
 $v$ = source velocity in direction $x$
 $x$ = source distance from lens axis 14
 $\lambda$ = wavelength
 $f$ = frequency
 $c$ = velocity of light
 $q$ = object distance The information distance bandwidth $\beta = 2\pi B$ is given by $$B = v\,L/\lambda q = (v\,L/c\,q)f \tag{5}$$

where $L$ is the length subtended by the angle $\theta$ at the object distance $q$.

The time delay $\tau$ provided by the delay unit 6 is given by:

$$\tau = (d/c) = (d_o/c_o) \tag{6}$$

where
 $d$ = physical path difference between the two beams in delay unit 6
 $d_o$ = optical path difference between the two beams in delay unit 6
 $c$ = velocity of light in air
 $c_o$ = velocity of light in delay medium The system of the present invention operates in either of two versions; in one version the path difference $d$ and consequently the time delay $\tau$ are constants while in other versions these parameters may vary as functions of time and/or frequency. The physical path difference $d = c\,d_o/c_o$ can be implemented as a thick or multilayer dielectric mirror 17 and 18.

In the first approximation, the current at the output of the quantum detector 8 in a direct detection system is, except for a constant;

$$i_d(t) = \left| \int H(\omega)\,S(\omega)\,\cos(\omega\tau/2)\,e^{j\omega t}\,d\omega \right|^2 \tag{7}$$

where the function $H(\omega)$ is the receiver transfer function, i.e., the dependence upon frequency of the sensitivity of the quantum detector. To simplify the present discussion, the function $H(\omega)$ will be considered to equal unity over the bandwidth $\beta$. Under this assumption, and the additional assumption that only frequencies given by equation (3) contribute to the integral of equation (8), the output current can be written simply as:

$$i_d(t) = \tfrac{1}{2}[1 + \cos(\omega_d \; 30 \; \omega_n)\tau] \; i(t) \qquad (8)$$

where $$i(t) = \left| \int S(\omega) \, e^{j\omega t} \, d\omega \right|^2 \qquad (9)$$

Equation (8) indicates that the current $i_d(t)$ at the output of the quantum detector 8 consists of a dc and ac terms provided the delay time $\tau$ is different from zero, i.e., $\tau \neq 0$. Furthermore, several distinct versions of the operation of the system of the present invention may result from the particular method by which the time delay $\tau$ is implemented in the delay unit 6. If the time delay $\tau$, given by equation (6), is a constant then the amplitude modulation of the current $i_d(t)$ at the output of the quantum detector 8 is a cosine wave at constant frequency given by:

$$f_1 = v^2 \; Z/\lambda q \qquad (10)$$

If on the other hand the time delay $\tau$ is implemented as a function of time then the amplitude modulation of the current $i_d(t)$ at the output of the quantum detector 8 is a cosine wave having a frequency which varies in time. Either case can be readily implemented in the delay unit 6 by programming the path difference $d$ to vary as the required function of time. For example, if the path difference $d$ is varied as a linear function of time the path delay $\tau$ becomes a linear function of time and the amplitude modulation of the current $i_d(t)$ at the output of the quantum detector is a cosine wave having a frequency with linear FM and, except for a constant, given by:

$$f_2 = v^2 \; t/\lambda q = f_d \qquad (11)$$

Thus, provided $\tau = k\,t$ where $k$ is the slope of the time delay versus time characteristic of the delay unit 6 — a constant — the system of the present invention preserves the information bandwidth B, given by equation (4).

In equation (8) $\tau = 0$ corresponds to the case without differential delay between beams, i.e., essentially without the delay unit 6. For this case, absence of the cosine modulation at the receiver output prevents the detection of a source motion. Effectively then, for this case, the information phase relationships have been destroyed by the receiver which therefore is not optimized. It is an easy matter for this case to show that the detected current pulse $i_d(t)$ at the output of quantum detector 8 is of the time duration:

$$T = L/v = q\,\theta/v = q\,\lambda/v\,D \qquad (12)$$

The minimum separation of targets at the object distance $q$ which can be resolved by this particular type of receiver is therefore $L$. This case has therefore the same resolving power as does the case for stationary targets. Both cases are limited by the diffraction angle $\theta$ given by equation (1). Thus, target motion information is destroyed in a receiver if a beamsplitter or differential delay device is not implemented to provide a differential time delay $\tau$ between beams. This is precisely the case for conventional radiometers.

Equation (8) relates the fact that for $\tau \neq 0$ the current pulse $i(t)$ of duration $T$, given by equation (12), can be amplitude modulated as a function of time with a cosine modulation. Furthermore, when the time delay $\tau$ is implemented as a function of time in the delay unit 6, and in particular when $\tau = k\,t$, the frequency of the cosine modulation becomes proportional to the doppler frequency given by equation (4) and having the information bandwidth given by equation (5).

The processing of signals of the type given by equation (8) in the data processor 10 is a well known and straightforward procedure. Essentially, a pulse of duration $T$ and bandwidth $B$ is processed by the data processor 10 to obtain a short pulse of duration $1/B$ for each encoding element 2, as illustrated in FIG. 3.

FIGS. 6a, 6b and 6c illustrate the cosine modulation waveform which is generated by the synthetic radiometer for a single target encoding element 2 and when the time delay $\tau$ has been implemented as the particular function of time $\tau = k\,t$. In this case the signal at the output of the quantum detector 8 consists of a pulse of frequency modulation (FM) of bandwidth $k\,B$, where $B$ is given by equation (5), and time duration $T$, given by equation (12), as shown in the figure. If the encoded element 2 transits the beamwidth 12 uniformly along the direction $x$ the frequency modulation of the detected signal, shown in FIG. 6a decreases uniformly between frequency $f_1$ at time $t_1$ to frequency $f_2$ at time $t_2$ where $t_2 - T_1 = T$ is the signal duration, $f_2 - f_1 = B$ is the information bandwidth, and $f$ is the center or carrier frequency, as shown by the solid curve of FIG. 6b. The signal shown in FIG. 6a is therefore a linear downchirp.

The required processing of the signal shown in FIG. 6a in the data processor 10 can be viewed as a weighted vector summation process or operation, a matched filter operation, or a correlation operation. For whichever viewpoint is chosen a particular hardware configuration will result to process the signal. The processed signal is shown as the solid curve of FIG. 6c and is shown as a $\sin x/x$ pulse with $x = \pi B(t - t_2)$ and having a pulsewidth of $1/B$ as measured at the half power points. It is a well known fact that this type of pulse can be produced when the signal has the characteristic described by the solid curve in FIG. 6b and the data processor has been implemented having the characteristic given by the dashed curve in FIG. 6b. The dashed line pulse illustrated in FIG. 6c represents the envelope of time sidelobes which result when the input pulse shown in FIG. 6a has been tapered, as most likely the case will be in practice. These sidelobes are always significantly below those shown for the $\sin x/x$ pulse of FIG. 6c which corresponds to the flat pulse of FM shown by way of illustration in FIG. 6a.

It can be readily seen that the system of the present invention generates a synthetic aperture in a manner which is analogous to that which is employed in synthetic radar. However, the synthetic aperture of the present invention may be generated passively whether or not the signals themselves are coherent or not and especially when the target is a broad spectrum noncoherent source. In the particular example for which the time delay $\tau$ in the delay unit 6 is implemented as a linear function of time $\tau = k\ t$, it is an easy matter to see that the system of the present invention will generate the synthetic aperture $D_s$ given as $$D_s = k\ B\ T\ D = k\ L \quad (14)$$

where
- $k$ = the slope of the time delay versus time characteristic in the delay unit 6
- $B$ = information bandwidth given by equation (5)
- $T$ = signal time duration given by equation (12)
- $D$ = actual size of lens or antenna aperture 5
- $L$ = resolution distance of a lens or aperture limited by diffraction The angular resolution $\theta_s$ provided by the synthetic aperture $D_s$ of the present invention is given by $$\theta_s = \lambda/D_s = \lambda/k\ B\ T\ D = \lambda/k\ L \quad (15)$$

The spatial resolution $s$ provided by the synthetic aperture $D_s$ of the present invention is given by $$s = \theta_s\ q = \lambda q/k\ B\ T\ D = \lambda q/k\ L = D/k \quad (16)$$

This last equation indicates the important result of the present invention, namely that the resolving capability of the synthetic radiometer is proportional to the size of the lens or antenna aperture, being independent of the parameters of wavelength $\lambda$ and target range. In contrast, the conventional radiometer has a resolution which is linearly proportional to the wavelength $\lambda$ and the distance and is inversely proportional to the lens or antenna aperture size $D$.

The quantities $D_s$, $\theta_s$, and $s$ for the synthetic radiometer correspond to the quantities $D$, $\theta$, and $L$ of a conventional diffraction limited lens or aperture system. Equation (14) gives the effective aperture of the synthetic radiometer. Equation (15) gives the theoretical limit of angular resolution of the synthetic radiometer. Equation (16) gives the magnitude of the spatial resolution of the synthetic radiometer. Thus, the improvement in the peak power and resolving power which is provided by the synthetic radiometer can be found by taking the appropriate ratios indicated by equations (14) through (16) and is given as $$I = L/s = \theta/\theta_s = D_s/D = k\ B\ T \quad (17)$$

As example, it can be readily shown using equation (17) with $k = 1$ that a synthetic radiometer operating at a wavelength of 10.6 microns with a 3 cm lens from an altitude of 500 nm provides a ground resolution of 3cm and with an improvement of 40 db over a conventional radiometer using the same size lens.

Physically, the time delay $\tau$ which is required to vary as a function of time, say $\tau = k\ t$, can be obtained by any one of several means; mechanically, electrically, magnetically, or acoustically, in accordance with the teachings of Electronic Design (See Ref 4) and Fang-Shang-Chen (See Ref 5). A simple mechanical implementation is, referring to FIG. 2, to tilt one or both mirrors 17 and 18 so that the path lengths 13, 14, and 15 in the delay unit 6 become adjusted spatially to provide $\tau = k\ t$. A target encoded element 2 which is in transit of the beamwidth 12 will produce in this case a current in accordance with that which is predicted by equation (8) at the output of the quantum detector 8, i.e., a chirp signal one typical example of which has been shown in FIG. 6.

In operation, as a target dipole 2 enters the beamwidth 12 its signal (comprising a single or a bundle of frequencies) flashes along path 15 through the antenna unit 5, delay unit 6, frequency synchronizer 7, and detector 8. The target dipole 2 signal flashes along path 14 when the dipole is at the center of the beam and flashes along path 13 as the dipole exits from the beam, i.e., a signal flashes from the target dipole 2 to the detector 8 for each instant of its presence within the beamwidth 12. In the absence of delay unit 6 and frequency synchronizer 7 (i.e., in a conventional radiometer), the detector 8 produces a dc current whose duration in time corresponds to the time the target dipole 2 is in the beamwidth 12. With the addition of the delay unit 6 the dc current is modulated in amplitude by a cosine wave whose frequency contains the doppler information as illustrated in FIG. 6. The doppler is zero along path 14, being positive along path 15 (approaching target) and negative along path 13 (receding target). If the target signal consists of a bundle of frequencies such as from naturally emitting targets, the entire spectrum of frequencies is shifted along a given path according to the doppler frequency. The frequency synchronizer 7 takes the bundle of frequencies along a given path, say path 15, and converts the bundle to a single frequency, i.e., simply changes the spectral distribution of frequencies but not the doppler.

The present invention can be implemented either as a direct or heterodyne detection system in accordance with the teachings of Kerr (See Ref 6), Ross (See Ref 7), Delange (See Ref 8), and Sommers and Gatchell (See Ref 9) and can be used in either case whether the targets themselves radiate or reflect signals coherently or incoherently.

In general, the detector 8 is implemented as a linear array of detectors, each detector corresponding with a single diffraction limited beamwidth 12. The detector output for each target is a cosine modulated DC pulse of duration $T$ and bandwidth $B$. The receiver 9 and data processor 10 can be implemented as an integrating or multiplying recirculating delay line with delay $t_s$ in accordance with the teachings of Skolnik (See Ref 10). The system resolution between targets is determined by the inverse bandwidth ratio $1/B$. The signals from individual target elements also may be integrated (for some applications) in the postdetection sense in accordance with the teachings of Skolnik (See Ref 11).

The basic operation of the present invention has been illustrated thus far in one dimension. The additional capability of the present invention to operate in two dimensions will now be further illustrated.

Several conventional two-dimensional scanning techniques are described in "Spacecraft Infra-red Imaging" by John J. Horan, IEEE Spectrum July 1968 page 66. Although applicable to the present invention such techniques limit the potential system resolution in the direction normal to that of the motion $x$, because of lens diffraction. Preferred techniques for obtaining two dimensional images which are not limited by lens diffraction in the crossrange direction are described in "On the Application of Coherent Optical Processing Techniques to Synthetic Aperture" by L. J. Cutrona et al., Proc IEEE August, 1966 and "An Introduction to Synthetic Aperture Radar" by W. M. Brown and L. J. Porcello, IEEE Spectrum September, 1969. Using the techniques of conventional synthetic aperture for obtaining two dimensional images therefore results in the fullest potential for the system of the present invention. Other means however for obtaining two dimensional images are feasible and these will now be discussed.

It is an easy matter to see that the detector 8 when implemented as an array of detectors in two dimensions will provide a number of parallel diffraction limited channels each channel corresponding to a single detector in the planar array. It should be recognized that the beamwidth 12 shown in FIG. 2 and FIG. 4 by way of illustration is but a single diffraction limited component of a bundle of similar beamwidths the totality of which constitute the antenna unit field of view. Each such parallel channel operates in the manner disclosed thus far. Thus, a synthetic aperture is generated by each channel in the direction $x$. No corresponding synthetic aperture is generated however in the direction normal to $x$ in the object plane. The synthetic aperture therefore determines the resolution of objects in the direction $x$ in accordance with the technique of the present invention while the Rayleigh criterion whose approximation is given by equation (1) may determine in some embodiments of the invention the resolution of objects in the direction normal to $x$. Shaping of the beamwidth 12 both in the $x$ and normal to $x$ directions can be utilized in a non-preferred embodiment of the invention to offset the differential resolving capabilities in the two directions.

This technique however is but one way to equalize the system resolving capability in two dimensions and has every disadvantage of a conventional aperture system. Another technique for accomplishing two dimensional operation of the present invention has to do with the implementation of the system as a conventional active system using a transmitting oscillator 11 with pulse modulation for resolving the crossdirection. The use of an active system may be considered in applications where either or both the range of targets and the two dimensional resolution of targets must be obtained. Again, active operation has every disadvantage of a conventional active system. Yet another technique for accomplishing the two dimensional operation of the present invention has been disclosed by Constant (See Ref 12) and is a most efficient means for accomplishing this task. To the extent to which the system is implemented to operate in two dimensions it can serve in applications such as the real time surveillance of ground targets by satellites, the reading of pages in a book, and the automatic recognition of patterns and letters. To the extent that the system is implemented to operate in one dimension it can serve in applications such as ground mapping in delayed time operations and in applications for the identification and control of objects using labels with simple elements which do not require special structures and precise dimensions and characteristics such as resonators, etc.

The signal power level of a pulse 24 at the output 23 of the data processor 10 is improved by the factor $B\ T$ over the signal power level which is available at its input. The signal width of a pulse 24 at the output 23 of the data processor 10 is $1/B$ and is much smaller than the signal duration $T$ which is available at its input. The resolution which can be attained by the synthetic radiometer is given by equation (16) and is seen to be a substantial improvement over the resolution of a conventional system. The resolution improvement factor is $B\ T$. An interesting aspect of the present invention, much like the case for conventional synthetic aperture, is the fact that the resolution, given by equation (16), is independent of the object distance $q$ and the wavelength $\lambda$ for the particular condition when $D_s = L$ in which case the resolution equals the actual aperture dimension $D$. In the general case $D_s$ is different from $L$ and the resolution is then proportional to $D$. It will be recalled that the resolution of a conventional diffraction limited aperture is proportional to both the object distance $q$, the wavelength $\lambda$, and is inversely proportional to the aperture dimension $D$. It can be seen therefore that the synthetic radiometer of the present invention will significantly exceed the performance of a conventional radiometer both as to the relative signal strength available at the radiometer output and the capability to resolve targets.

Using the synthetic radiometer and encoding array of the present invention therefore provides an efficient system with high signal, contrast, ranging, and resolving powers. This improvement extends the capability of conventional coherent synthetic radar to generate a synthetic aperture which is much greater than the actual aperture of the system to the general class of signals, emissions or reflections from targets, which are themselves non-coherent.

Although a particular configuration of a synthetic radiometer and encoding array has been described, it should be understood that the scope of the invention should not be considered to be limited by the particular embodiment of the invention shown by way of illustration, but rather by the appendant claims. The synthetic radiometer may be used for detecting the presence of uncoded objects as well as for identifying encoded objects.

REFERENCES

1. W. P. Alford and A. Gold, Am. J. Phys., vol 26, p. 481, 1958.
2. M. P. Givens, J. Opt. Soc. Am., vol 51, p. 1030, 1961.
3. J. Q Bortling "The Use of the Alford and Gold Effect as a Ranging Technique" Proc IEEE (Lett.) p. 1,335, July 1,969.
4. Electronic Design 22, p. 51, Sept. 27, 1966.
5. F. S. Chen "Modulators for Optical Communication" Proc IEEE vol 58, No. 10, October 1970.
6. J. R. Kerr "Microwave Bandwidth Optical Receiver Systems" Proc IEEE October 1967; in particular re: Optical Frequency Translation.
7. M. Ross "Choosing Detectors for Laser Receivers" Microwaves January 1966.
8. O. E. DeLange "Optical Heterodyne Detection" IEEE Spectrum October 1968.
9. H. S. Sommers Jr and E. K. Gatchell "Demodulation of Low Level Broadband Optical Signals with Semiconductors" Proc IEEE November 1966.

10. M. I. Skolnik "Introduction to Radar Systems" McGraw-Hill 1962 pp. 445–449.
11. ibid, pp 35–40.
12. J. Constant "Real Time Synthetic Radar" U.S. pat. appl. Ser. No. 46,409 11/24/70, now abandoned and part of continuation-in-part application U.S. Ser. No. 252,711, May 12, 1972.

What is claimed is:

1. In a synthetic radiometer having an antenna unit for receiving radiation from an object of interest, a detector for a radiation beam from the antenna unit, a receiver for signals from the detector, and a data processor for signals from the receiver, the improvement comprising:
a delay unit inserted between the antenna unit and the detector, said delay unit including means for separating incoming radiation from said antenna unit into at least two beams along different paths, and means for recombining the outgoing radiation to said detector into a single beam, with the paths of different length providing a delay in one separated beam relative to the other and providing a modulated beam at the detector for a radiating object moving through the field of the optical unit.

2. A radiometer as defined in claim 1 wherein said delay unit includes a beamsplitter and first and second mirrors positioned at different distances from said beamsplitter, with said beamsplitter directing an incoming beam to each of said mirrors for reflection back to said beamsplitter for recombining forming an outgoing beam along a different path.

3. A radiometer as defined in claim 1 wherein said delay unit includes a beamsplitter and beam combiner, with said beamsplitter directing an incoming beam along a first path and along a second path to one or more mirrors for reflection to said recombiner for recombining to form an outgoing beam along the first path.

4. A radiometer as defined in claim 1 wherein said delay unit includes a Michelson interferometer.

5. A radiometer as defined in claim 1 wherein said delay unit includes a Fabry-Perot interferometer.

6. A radiometer as defined in claim 1 wherein said delay unit includes a reflector having multilayer interference coatings.

7. A radiommeer as defined in claim 1 including a frequency synchronizer unit inserted between said delay unit and detector for changing the frequencies in a signal spectrum of the beam to the mean frequency.

8. A system as defined in claim 1 wherein said delay unit provides a cosine modulation of the modulated beam.

9. A system as defined in claim 1 wherein said delay is a constant.

10. A system as defined in claim 1 wherein said delay is a linear function of time.

11. A system as defined in claim 1 wherein said delay is a function of time.

12. A system as defined in claim 1 wherein the signal from said receiver is a chirp signal.

13. A system as defined in claim 1 including a transmitter for directing radiation toward objects of interest.

14. In a system for identifying objects with a code, the combination of:
a plurality of passive encoding arrays with an array for each object,
each of said arrays having a plurality of code element locations with code elements disposed at selected locations, with the presence and absence of code elements at code element locations comprising a code for the object, and with a code element comprising a zone having a radiation characteristic different from that of the background; and
a synthetic radiometer including an antenna unit for receiving radiation from an array, a detector for a radiation beam from the antenna unit, a receiver for signals from the detector, a data processor for signals from the receiver, and a delay unit inserted between the optical unit and the detector, said delay unit including means for separating incoming radiation from said antenna unit into at least two beams along different paths, and means for recombining the outgoing radiation to said detector into a single beam, with the paths of different length providing a delay in one separated beam relative to the other and providing a modulated beam at the detector for each code element moving through the field of the antenna unit.

15. A system as defined in claim 14 wherein said code is a binary code.

16. A system as defined in claim 14 wherein the spacing of code element locations of an array for a system operating at a particular wavelength and frequency is substantially proportional to the size of the antenna unit aperture along the path of relative motion of radiometer and array.

17. A system as defined in claim 14 wherein the spacing of code element locations of an array is substantially a linear dependence of the antenna unit aperture along the path of relative motion of the radiometer and array and is substantially independent of wavelength and range.

18. A method of generating a synthetic aperture with an object in the field of a synthetic radiometer including the step of cosine modulating the radiation of the beam from the antenna unit to the detector of the radiometer as a function of time delay providing an amplitude modulated signal for detection and processing.

19. The method as defined in claim 18 including dividing the beam from the antenna unit for passage along at least two paths of different length and recombining the beam ahead of the detector.

20. The method as defined in claim 18 including the step of changing the frequencies in a signal spectrum of the modulated radiation to the mean frequency thereof.

* * * * *